Patented Jan. 20, 1931

1,789,668

UNITED STATES PATENT OFFICE

KARL BRODERSEN AND WERNER EXT, OF DESSAU IN ANHALT, GERMANY, ASSIGNORS, BY MESNE ASSIGNMENTS, TO WINTHROP CHEMICAL COMPANY, INC., OF NEW YORK, N. Y., A CORPORATION OF NEW YORK

ANIMAL DIP

No Drawing. Application filed May 14, 1926, Serial No. 109,199, and in Germany June 2, 1925.

The present invention relates to animal dips and more particularly to animal dips containing as active constituents a soluble poison and an insoluble poison in a colloidal form.

In combating the sarcoptic itch (or scab) and similar skin parasites, particularly in sheep, baths are used which contain as active constituents a soluble poison, such as sodium arsenite, and sulphur, as well as arsenic trisulphide. It is very difficult to wet these agents, so that they are not easily miscible with water and have little tendency to remain in suspension, necessitating continuous mechanical stirring of the bath. This defect detracts from their certainty of action.

According to this invention, preparations in powdered form, which are free from the foregoing defect are made by combining a soluble parasite poison with an insoluble one in highly dispersed or colloidal form, for example sulphur, arsenic. trisulphide or other insoluble insecticides. The composition of the preparation may be such that the colloidal form is developed wholly or in part only during the operation of dissolving or on exposure to air on the animal. This result can be attained by adding sodium sulpharsenite to the preparation, or a mixture of an alkali, such as sodium carbonate, and arsenic trisulphide, which is a poison, dissolution occurring on addition of water.

The preparation may advantageously contain a wetting agent, a protective colloid, an agent for protecting fibers.

The following example illustrates the invention, the parts being by weight:

25 parts of sodium arsenite, 50 parts of a sulfur preparation containing 30% of colloidal sulfur and a protective colloid, such as that of U. S. Patent 1,048,161, for example as that of U. S. Patent 1,048,161, 10 parts of anhydrous sodium carbonate, 10 parts of powdered sulphur and 5 parts of arsenic trisulphide are ground together in a ball mill. For preparing the bath a suitable quantity of the powder thus made is added to the water by which it is wetted readily and taken up as compared with the known preparations. The bath does not settle and is very certain in its action.

It is obvious to those skilled in the art that our present invention is not limited to the foregoing example or to the details given therein. Thus for instance cell pitch (from sulphite cellulose liquor) (see, for example, U. S. Patent 1,419,497, lines 27-30, and U. S. Patent 1,441,240, lines 35-37) may be added as protective colloid and agent for protecting fibres or the quantities of the ingredients can be varied in wide limits.

What we claim is—

1. Animal dip containing a water soluble arsenical compound and colloidally dispersed sulphur.

2. Animal dip containing a water soluble arsenical compound, a colloidally dispersed arsenical compound and colloidally dispersed sulphur.

3. Animal dip containing a water soluble arsenical compound, a colloidally dispersed arsenical compound, colloidally dispersed sulphur and a protective colloid.

4. Animal dip containing sodium arsenite and colloidally dispersed sulphur.

5. Animal dip containing sodium arsenite, a colloidally dispersed arsenical compound and colloidally dispersed sulphur.

6. Animal dip containing sodium arsenite, a colloidally dispersed arsenical compound, colloidally dispersed sulphur and a protective colloid.

7. Animal dip containing sodium arsenite, colloidally dispersed arsenic trisulphide and colloidally dispersed sulphur.

8. Animal dip containing sodium arsenite, colloidally dispersed arsenic trisulphide, colloidally dispersed sulphur and a protective colloid.

9. Animal dip containing sodium arsenite, colloidally dispersed arsenic trisulphide, colloidally dispersed sulphur and cell pitch.

In testimony whereof we affix our signatures.

KARL BRODERSEN.
WERNER EXT.